United States Patent [19]

Wilkinson, Jr.

[11] Patent Number: 5,782,591
[45] Date of Patent: Jul. 21, 1998

[54] UNIVERSAL TOOL HOLDING DEVICE FOR USE WITH A POWER-DRIVEN, ROTATABLE SPINDLE MACHINE

[76] Inventor: Daniel Wilkinson, Jr., New York Central Rd., Port Byron, N.Y. 13140

[21] Appl. No.: 648,922

[22] Filed: May 16, 1996

[51] Int. Cl.$^6$ ........................................ B32C 1/02
[52] U.S. Cl. .......................... 409/131; 279/42; 279/125; 408/239 R; 408/710; 409/232
[58] Field of Search ........................ 408/1 R, 239 R, 408/239 A, 238, 710; 409/131, 132, 231, 232, 233; 279/8, 42, 48, 52, 155, 157, 125

[56] References Cited

U.S. PATENT DOCUMENTS

| | | | |
|---|---|---|---|
| 1,823,971 | 9/1931 | Erlandson | 408/239 R |
| 2,449,284 | 9/1948 | Dorman | 279/1 |
| 2,730,220 | 1/1956 | Dodd | 192/114 |
| 3,026,116 | 3/1962 | Marini, Sr. | 279/48 |
| 4,126,081 | 11/1978 | Zdeb | 90/11 |
| 4,171,821 | 10/1979 | Miller | 279/75 |
| 4,413,938 | 11/1983 | Kuczenski | 278/8 |
| 4,477,095 | 10/1984 | Atkinson | 279/1 A |
| 4,548,532 | 10/1985 | Watanabe et al. | 409/233 |
| 4,552,494 | 11/1985 | Wix | 408/67 |
| 4,722,645 | 2/1988 | Regan | 408/239 A |
| 5,201,620 | 4/1993 | Forrest | 409/232 |

FOREIGN PATENT DOCUMENTS

| | | | |
|---|---|---|---|
| 1109983 | 6/1961 | Germany | 408/238 |
| 2302210 | 7/1974 | Germany | 409/232 |
| 1297762 | 11/1972 | United Kingdom | 279/48 |

*Primary Examiner*—Daniel W. Howell
*Attorney, Agent, or Firm*—George R. McGuire

[57] ABSTRACT

An apparatus and method for securely, mechanically retaining an elongated tool holding arbor in the tapered bore formed in the spindle of a conventional, rotatable, power driven spindle machine. The arbor is mechanically secured to the spindle by bridging it to a key via a threaded fastener. The arbor includes a longitudinal hole formed therethrough having at least first and second concentric passageways of different diameters. The rectangularly shaped key is sized to be operatively received within and set upon shoulders formed by first and second diametrically opposed openings formed through the spindle. The key includes a tapped hole formed centrally, transversely therethrough. The arbor may be inserted into the spindle's bore, and a fastener having an enlarged head and a threaded shaft may be inserted through the arbor's hole with the threaded shaft passing freely through both first and second passageways, and the head passing through the first passageway but not the second. An allen head wrench may then be inserted through the arbor's hole until it engages the head of the fastener. By rotating the wrench clockwise, the threaded shaft portion will engage the tapped hole formed through the key, thereby bridging the arbor to the key. The wrench should be continuously rotated until the key and arbor are mechanically secured to the maximum extent possible.

17 Claims, 4 Drawing Sheets

UNIVERSAL TOOL HOLDING DEVICE FOR USE WITH A POWER-DRIVEN, ROTATABLE SPINDLE MACHINE

BACKGROUND OF THE INVENTION

The present invention generally relates to apparatus for holding a tool bit in a rotatable, power-driven spindle machine, such as a drill press, and more particularly related to such apparatus held in a spindle machine by mechanical fastening means.

A conventional, power-driven, rotatable spindle machine generally includes a cylindrically elongated spindle rotatably and concentrically mounted within a cylindrically elongated quill. The spindle and quill each include diametrically opposed, first and second openings formed therethrough, and the spindle's and quill's openings are manually radially alignable. The spindle further includes a tapered bore of predetermined dimension concentrically formed therein and extending with decreasing diameter from the spindle's lower end to the intermediate position along the spindle's length where the first and second openings are formed.

Tool bits are held in the rotatable spindle by means of an arbor which is securely attached to the spindle, and a collet assembly securely attached to the arbor. Traditionally, the arbor is a cylindrically elongated shaft having a tapered body portion which extends from an intermediate position along the arbor's length to the top end of the arbor, with the taper's dimensions corresponding precisely to the predetermined dimensions of the bore formed in the spindle. The bottom end of the arbor includes means, such as threads, for securely retaining a collet assembly thereon. The spindle's top end will also include a portion extending upwardly from the tapered body portion.

To operatively attach the conventional arbor to the spindle, a user simply inserts the tapered body portion into the bore by pushing it and then tapping the arbor's bottom end, if necessary, until the body portion is securely, frictionally retained within the bore. The precise, corresponding dimensions between the tapered body portion and tapered bore ensure a secure friction fit for holding the arbor within the spindle. Therefore, when the spindle rotates, the rotational motion is transferred to the arbor which, in turn, transmits it to a tool bit secured in the jaws of a collet attached to the arbor's bottom end.

In a drill press, for instance, the frictional force holding the arbor within the spindle is sufficient for conventional drilling operations. In fact, when the drill is lowered onto a workpiece, the upwardly directed reaction force applied to the drill bit, and hence the arbor, enhances and tightens the frictional fit between the tapered body and the walls of the tapered bore. Thus, the frictional connection sufficiently permits appropriate, traditional functioning of the drill press.

To remove the arbor from the spindle after use, the frictional connection is usually so tight that the arbor cannot simply be manually pulled away from the spindle. Instead, it is necessary to radially align the first and second openings formed through the spindle and quill, and then insert a wedge shaped key through the first or second openings until it engages the portion of the arbor body that extends upwardly from the end of the taper. Once engaged, the wedge key is pushed against the arbor, forcing (wedging) it downwardly until the friction is overcome and the arbor drops out of the spindle.

Alternatively, the bottom end of the arbor can be tapped in a radial direction. This will cause chattering to the body portion which, in turn, will cause air to come between the body portion and the sidewalls of the tapered bore. This air will cause gravity to overcome the frictional engagement between the body portion and tapered bore, and the arbor to consequently drop out of the spindle.

The effect of this radial tapping illustrate a shortcoming of the traditional arbor/spindle connection; namely, that any radially applied force to the tool bit or arbor will cause the arbor to become disengaged from the spindle. Thus, a drill press, for instance, can only be used for cutting motions causing vertical forces to be applied to the workpiece and tool. Consequently, a router bit, biscuiting bit, or sanding stone, for instance, could not be effectively used with a drill press, as the radial forces created by those tools would cause disengagement of the arbor from the spindle. Accordingly, it is necessary for a workman to buy expensive machinery, i.e., a router, drill press, lathe, etc., for each individual type of cut they need to make to a given workpiece, despite the fact that each machine operates on practically identical principles.

Accordingly, it is a principal object of the present invention to provide a tool holding arbor which may be operatively attached to a spindle by mechanical fastening means, in addition to the physical, frictional fastening.

It is an additional object of the present invention to provide a tool holding arbor that can safely and effectively hold tools which create either a vertical or lateral force to be applied to the arbor.

It is a further object of the present invention to provide a tool holding arbor capable of operatively receiving a safety guard thereon in order to protect a workman using the arbor from flying wood or metal chips.

It is yet another object of the present invention to provide a tool holding arbor which can be easily attached to or detached from a rotatable spindle.

It is still a further object of the present invention to provide a tool holding arbor that is easily and inexpensively manufactured.

Other objects and advantages of the present invention will in part be obvious, and in part appear hereinafter.

SUMMARY OF THE INVENTION

In accordance with the foregoing objects and advantages, the present invention is generally comprised of an elongated tool holding arbor and key arrangement which permit the arbor to be securely retained within a conventional, rotatable, power driven machine by a mechanical retaining means. The spindle machine includes a conventional, cylindrically elongated spindle rotatably and concentrically mounted within a quill. The spindle and quill each include manually, radially alignable first and second openings formed therethrough, and the spindle further includes a tapered bore extending with decreasing diameter from the spindle's bottom to an intermediate position along the spindle's length which corresponds with the position where the first and second are formed.

The arbor of the present invention includes a tapered body portion whose dimensions precisely correspond with those of the tapered bore, and which extends from an intermediate position along the arbor's length to the upper end of the arbor. The lower end of the arbor includes threads for receiving a conventional collet and collet nut thereon. A hole is formed concentrically through the arbor, and includes at least two distinct diameters. The larger diameter portion of the hole extends from the arbor's lower end to an intermediate position, and the smaller diameter portion extends from the intermediate position to the arbor's upper end. A portion of the hole's larger diameter portion immediately adjacent the smaller diameter portion has threads formed in the sidewalls thereof.

The key of the present invention is rectangularly shaped, and is dimensioned to be operatively received within the first and second openings formed through the spindle and quill. When inserted through the openings, the key may be longitudinally placed to rest on shoulders formed by the bottom of the openings formed through the spindle. A tapped hole is formed transversely through the key, at about the middle thereof.

To prepare the arbor to be connected to the spindle, a threaded shaft portion having a diameter less than that of the hole's smaller diameter portion, and a hex head of approximately the same dimension as the diameter of the larger hole portion is first inserted, shaft portion first, through the hole formed concentrically through the arbor. A hexagonal retaining nut is then inserted into the hole formed through the arbor. The retaining nut includes external threads corresponding in diameter with the internal threads formed in the larger diameter portion of the hole. A first allen head wrench may be used to threadingly engage the retaining nut in place. Accordingly, the drawbar's hex head may rest on the retaining nut, thereby preventing the drawbar from falling out of the arbor.

To attach the arbor to the spindle, the key is first inserted through the openings formed through the quill and spindle, and set on the shoulders formed by the bottom of the spindle's first and second openings. The tapered body portion of the arbor is then pushed into mating engagement with the spindle's tapered bore until it is frictionally held in place. A second allen head wrench, smaller than the first allen wrench and dimensioned to pass through the retaining nut, is then inserted into the hole formed through the arbor until it engages the hex head of the drawbar. The drawbar is then rotated, via the second allen wrench, until its threaded shaft portion engage the tapped hole formed through the key. The drawbar is continuously rotated until its shaft portion has engaged the tapped hole in the key the maximum amount possible, i.e., until the drawbar forces the key to its lowest possible position, thereby effectively retaining the arbor within the spindle its maximum amount. Thus, in addition to the frictional connection between the arbor's body portion and the sidewall of the tapered bore, the arbor is held in place by the mechanical connection created by the key and drawbar.

To remove the arbor from the spindle, the smaller of the two allen wrenches is inserted through the arbor's bore until engaged with the drawbar's hex head, and then rotated counter-clockwise, thereby causing the key to run up the threads of the drawbar. The wrench should be continuously rotated until the key is positioned in abutting relation to the upper surfaces of the spindle's first and second openings. This, consequently, will apply a downward force to the arbor, thereby loosening (breaking) the friction fit established between the arbor and the wall of the tapered bore. Finally, the drawbar can be rotated until it is completely removed from the key, thereby disengaging the mechanical retention between the arbor and key, and permitting the arbor to fall freely out of the spindle.

An additional feature of the present invention is a safety shield that is rotatably, snap fit onto the bottom end of the arbor. A pair of vertically spaced, annular grooves having corresponding O-rings are formed in the bottom end of the arbor, just above the collet receiving threads. A donut-shaped safety shield includes a set of annularly positioned ball bearings positioned between the inner diameter of the shield, and an annular connector bracket.

To attach the shield to the arbor, it is simply slid over the bottom end of the arbor and force fit over the O-rings. The ball bearings will permit the shield to rotate independently of the arbor. Thus, if the arbor is rotating at high RPM and the user's sleeve accidently engages the shield, the shield will decrease its rate of rotation due to the contact with the arm. Accordingly, the arm will not get pulled into the cutting area of the tool.

BRIEF DESCRIPTION OF THE DRAWINGS

The foregoing and other features of the invention will be more readily understood and fully appreciated from the following Detailed Description, taken in conjunction with the accompanying drawings, wherein.

DETAILED DESCRIPTION

Figure 1:
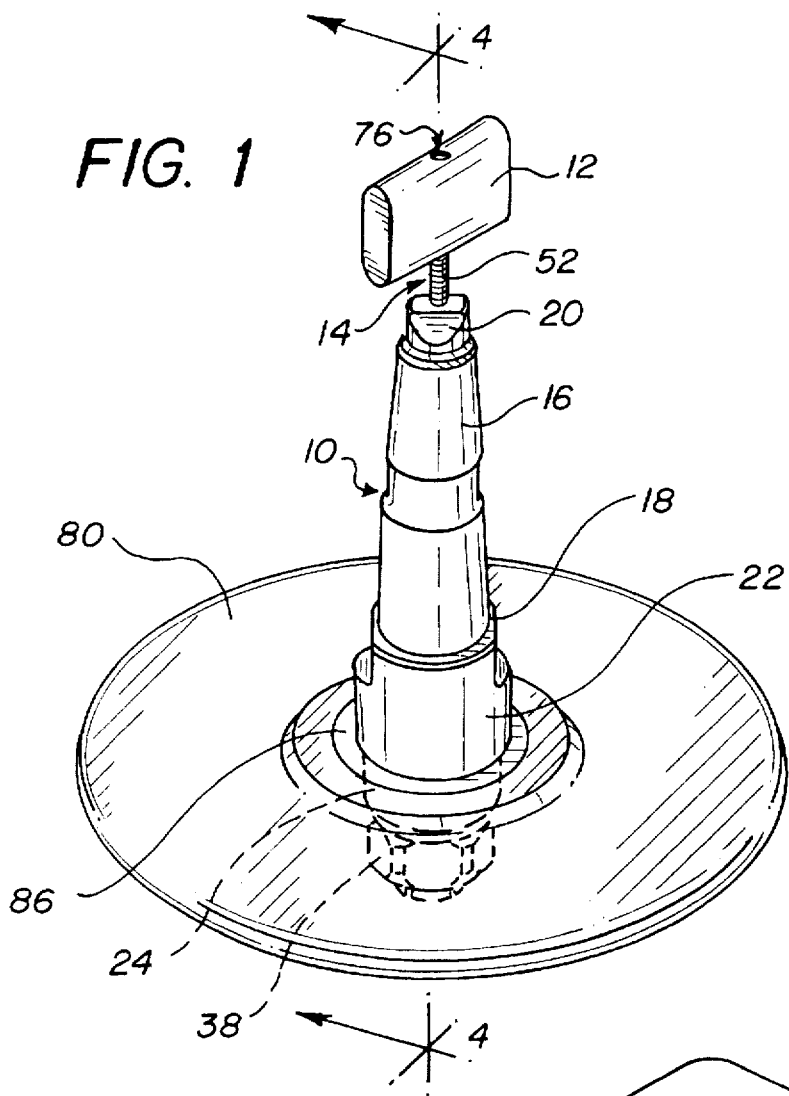
FIG. 1 is a perspective view of the present invention.
Figure 5:
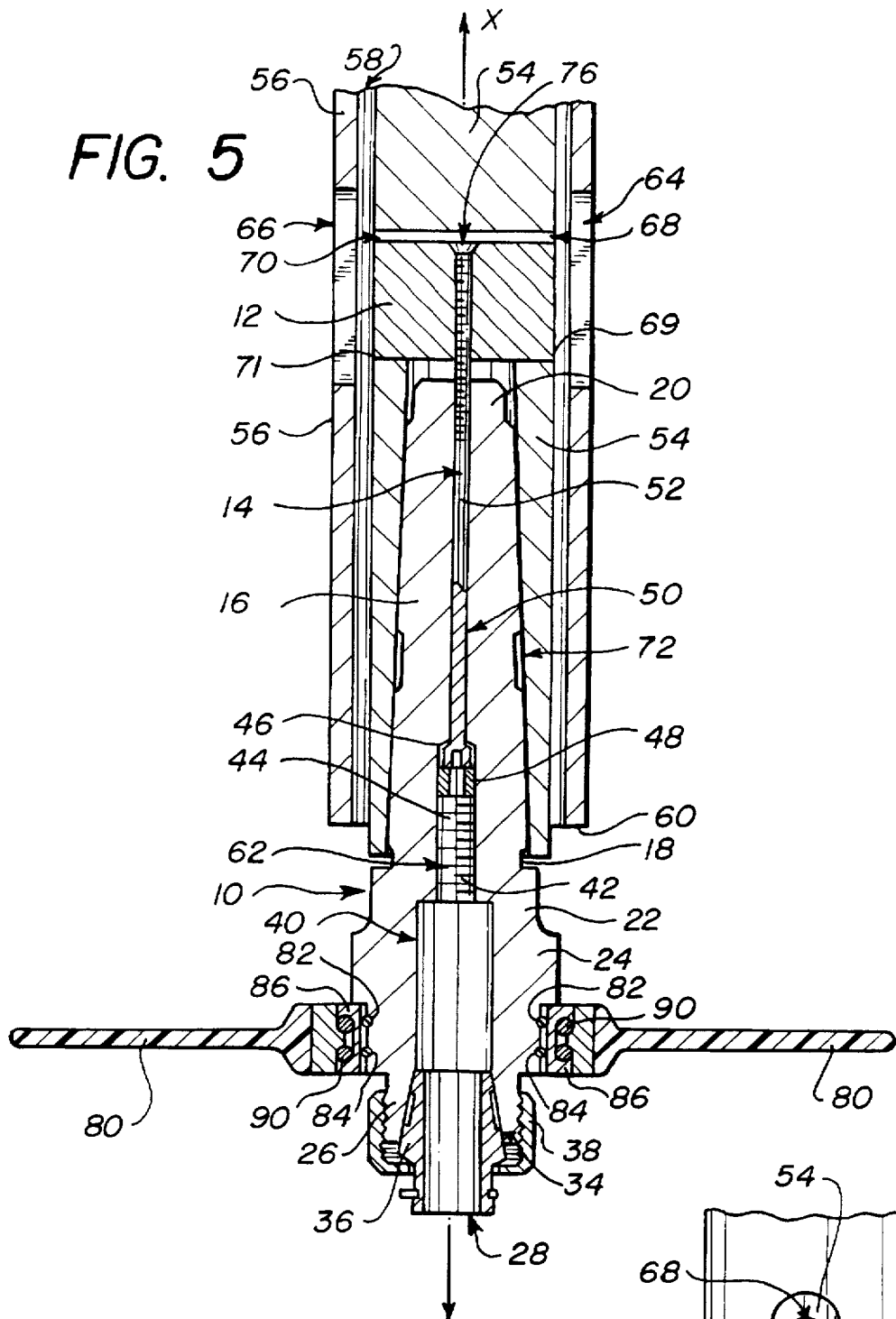
FIG. 5 is a front elevational, cross-sectional view of the present invention positioned within a conventional quill/spindle arrangement.

Referring now to the drawings, wherein like reference numerals refer to like parts throughout, there is seen in FIG. 1 a generally cylindrical tool holding arbor, denoted generally by reference numeral 10, releasably connected to a rectangularly shaped key 12 by means of a drawbar 14. Although FIG. 1 illustrates the physical connection between arbor 10 and key 12 absent any machinery, it is to be understood that their connection acts as a means for mechanically retaining arbor 10 in a conventional, power-driven, rotatable spindle machine, as seen in FIG. 5, and which will be explained in the forthcoming description.

Arbor 10 is generally comprised of a tapered body portion 16 (Morse taper) which extends, in decreasing diameter, from an intermediate position 20 along the arbor's length to the arbor's top end, and a lower portion which consists of a gripping portion 22 which extends from intermediate position 20 downwardly to a safety shield receiving portion 24, and terminates at a threaded, collet receiving portion 26. Arbor 10 further includes a hole 28 concentrically bored therethrough, and two, vertically spaced, shield receiving grooves 30, 32 annularly formed around shield receiving portion 24.

Hole 28, although continuous, includes four distinct regions, all of which are concentric with respect to the longitudinal axis X—X passing centrally through arbor 10. The first region 34 extends upwardly from the bottom of arbor 10 to about a position coincident with the radially planar interface between shield receiving portion 24 and collet receiving portion 26. Region 34 tapers inwardly to conform to the shape of a conventional collet 36 which may be securely held therein by a collet nut 38 threadingly attached to collet receiving portion 26.

A second region 40 extends upwardly from first region 34 to a depth sufficient to hold the shaft of any conventional cutting or shaping tool therein (i.e., a drill bit, sanding stone, router bit, etc.—tool not shown). Second region 40 is of a constant, predetermined diameter which is about equal to the smallest diameter of first region 34.

A third region 42 extends upwardly from second region 40 for a predetermined distance (a portion of the way along body portion 16). Third region 42 is of a constant, predetermined diameter smaller than that of second region 40, and includes internal threads 44 formed in it defining the wall. The predetermined diameter of third region 42 is sufficiently large to cooperatively receive the head portion 46 of drawbar 14 therein, and threadingly receive a retainer nut 48, the purpose of which will be explained hereinafter.

A fourth region 50 extends upwardly from third region 42 all the way through top 20. Fourth region 50 is of a constant, predetermined diameter, smaller than that of third region 42, which is sufficiently large to permit the partially threaded shaft portion 52 of drawbar 14 to pass therethrough, but sufficiently small to prohibit head portion 46 from entering therein. Thus, each of the four distinct regions 34, 40, 42, and 50 each serve a distinct function, and get progressively smaller in diameter as they extend from the arbor's bottom to top.

Figure 6:
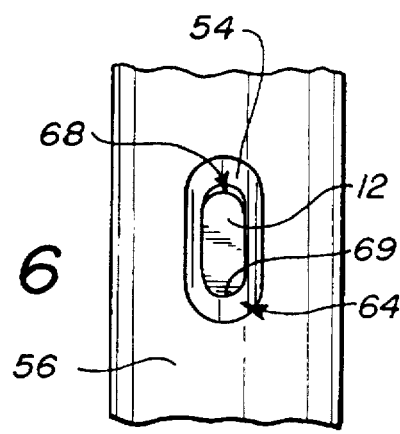
FIG. 6 is a partial side elevational view of a conventional quill/spindle arrangement.

The present invention is intended to be used in combination with a conventional, power-driven, rotatable spindle machine, such as a drill press for instance (no such machine being entirely shown). With particular reference to FIGS. 5 and 6, all such machines include a cylindrically elongated spindle 54 concentrically, rotatably mounted within a cylindrically elongated quill 56. A space 58 exists between spindle 54 and quill 56, and a ball bearing plate (not shown) is positioned within that space adjacent the top of quill 56. Space 58 and the ball bearings permit spindle 54 to freely rotate within quill 56.

Spindle 54 and quill 56 each include upper (not shown) and lower ends 60 and 62, respectively, and first and second diametrically opposed, oblong key slots 64, 66 and 68, 70, respectively, formed therethrough. Slots 64, 66 and 68, 70 are radially alignable by manually rotating spindle 54 until the slots are aligned, and are sized to permit key 12 to pass therethrough and be placed upon the bottom surfaces, or shoulders, 69, 71 of slots 68, 70, respectively.

Spindle 54 further includes a tapered bore 72 (Morse taper) concentrically formed therein, and which extends, in decreasing diameter, from bottom 62 to an intermediate position along the spindle's length, the intermediate position being radially coincident with slots 64, 66. Body portion 16 is shaped to conform to bore 72, each having substantially identical tapered dimensions. Therefore, body portion 16 may be positioned within bore 72 and securely held therein by the friction existing between body portion 16 and the wall defining bore 72.

However, any radial displacement of arbor 10 once positioned within spindle 54, would cause chatter between body portion 16 and the wall defining bore 72, thereby resulting in arbor 10 falling out from spindle 54. Accordingly, when friction is the sole force retaining arbor 10 within spindle 54, only vertical forces directed along longitudinal axis X—X may be safely applied to arbor 10 (and any tool which is being held by arbor 10). Thus, an additional arbor retaining means is necessary in order for arbor 10 to be able to operatively withstand any radial forces applied thereto.

Figure 2:
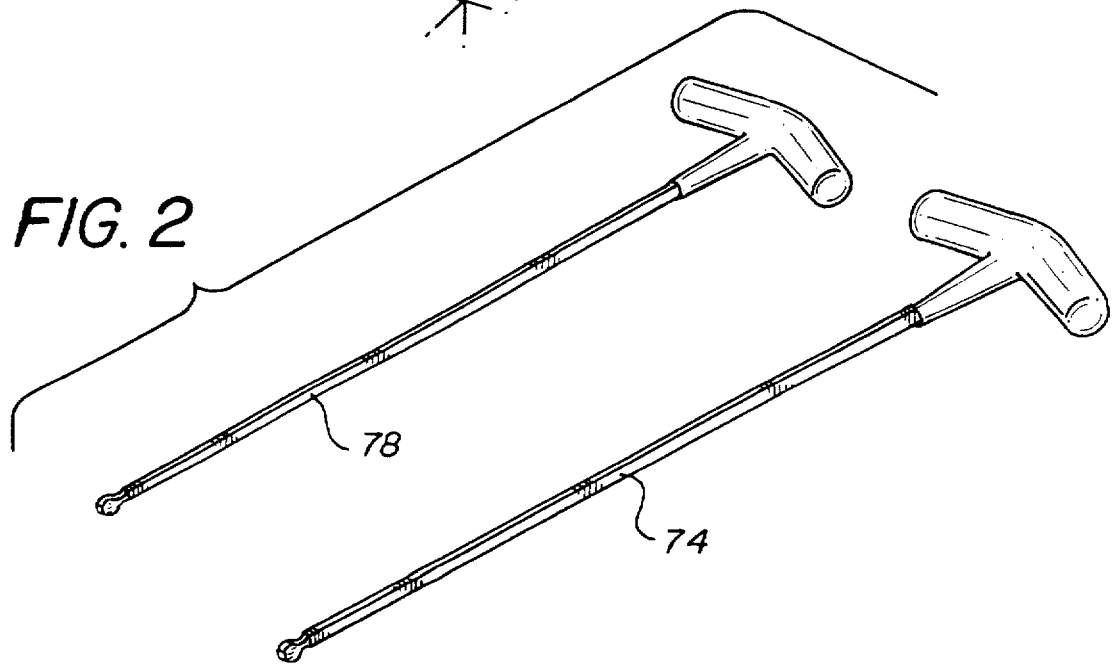
FIG. 2 is a perspective view of two different sized allen head wrenches used in the practice of the present invention.
Figure 3:
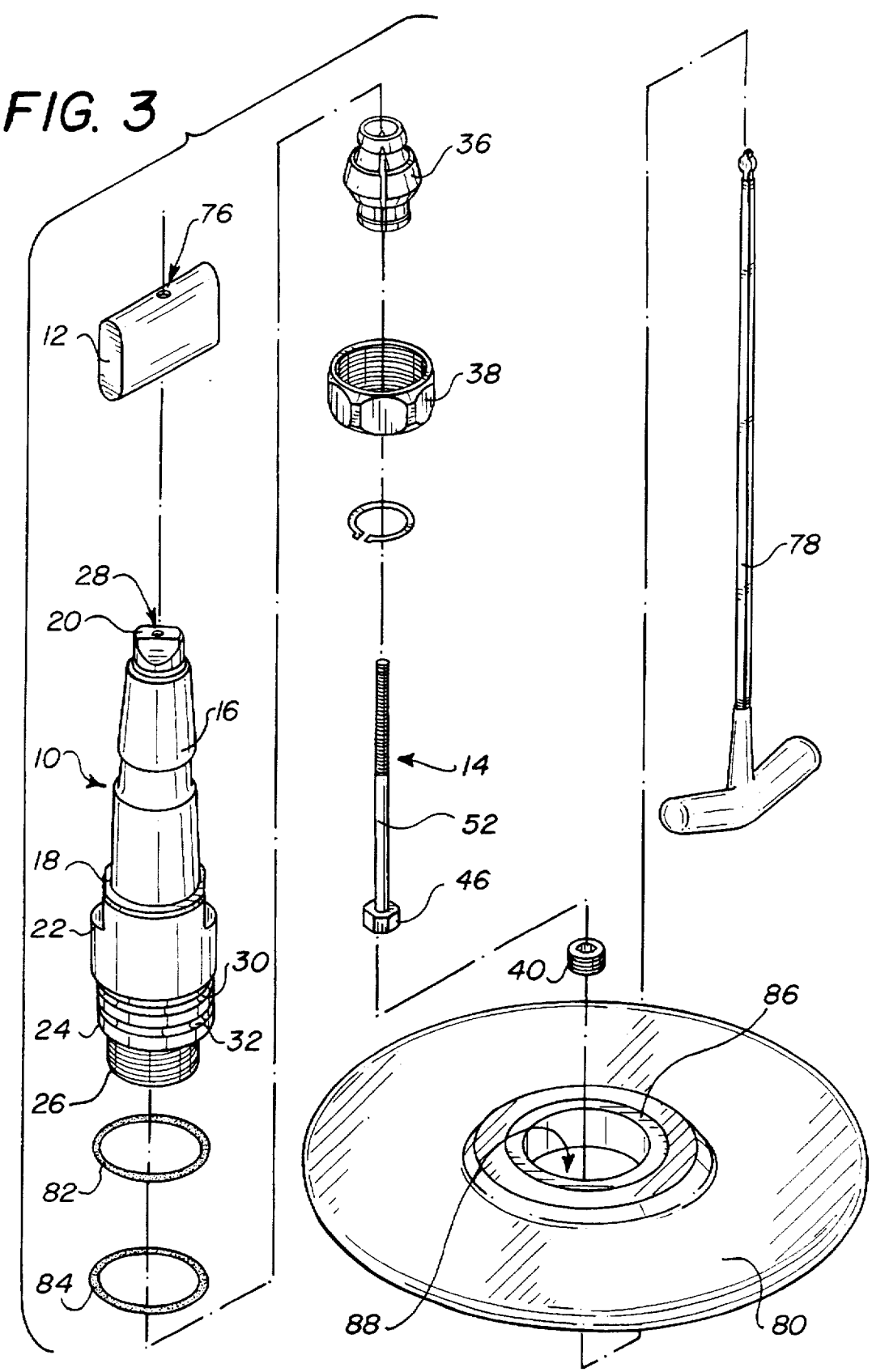
FIG. 3 is an exploded perspective view of the present invention.
Figure 4:
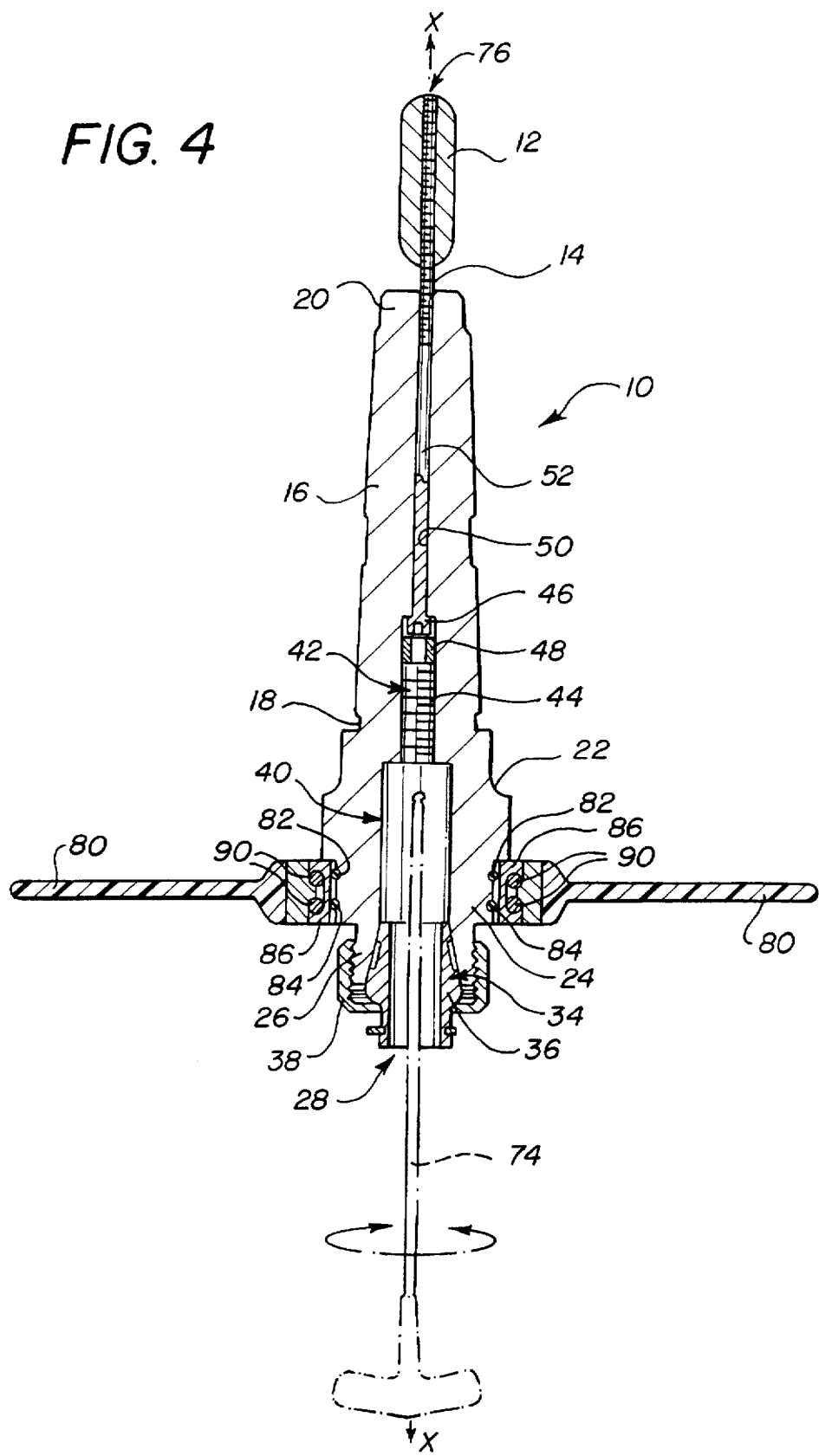
FIG. 4 is a cross-sectional view of the present invention, taken along section line 4—4 of FIG. 1.

In practicing the present invention, arbor 10 must be prepared to be mounted within bore 72. To prepare arbor 10 for connection to spindle 54, drawbar 14 is inserted, shaft portion 52 first, into the bottom of arbor 10 and through hole 28. Retaining nut 48 is then threaded into third region 42 by means of an allen head wrench 74 (see FIG. 2) sized to engage the hex head of nut 48. Nut 48 is threaded upwardly to its furthest point, thereby sandwiching head portion 46 of drawbar 14 between itself and the shoulder created by the interface of third and fourth regions 42 and 50. Therefore, head portion 46 rests on retaining nut 48, thereby preventing drawbar 14 from falling out of arbor 10.

To connect arbor 10 to spindle 54, key 12 is first placed through key slots 64 and 68, or 66 and 70, and set upon spindle shoulder surfaces 69 and 71. Key 12 includes a tapped hole 76 formed transversely therethrough, and it should be positioned in spindle 54 such that hole 76 is concentrically positioned therein. After key 12 is appropriately positioned within spindle 54, body portion 16 of arbor 10 is then inserted up into bore 72. As body portion 16 is inserted into bore 72, threaded shaft portion 52 of drawbar 14 will engage the lower end of hole 76. A second allen head wrench 78 (see FIG. 2), which is smaller than wrench 74, may then be inserted up through arbor 10, and through the open center of retainer nut 40 until it operatively engages head portion 46 of drawbar 14. Wrench 78 may then be rotated clockwise to thread shaft 52 into tapped hole 76, thereby bridging arbor 10 and key 12. It should be continuously rotated until key 12 is firmly abutting shoulders 69 and 71, and body portion 16 is firmly retained within bore 72. Thus, drawbar 14 interconnects arbor 10 to key 12, thereby effectively providing a mechanical retaining mechanism for holding arbor 10 within spindle 54.

To detach arbor 10 from spindle 54, wrench 78 is simply inserted back into engagement with head portion 46, and rotated counter-clockwise. This will cause key 12 to move away from shoulders 69 and 71, eventually abutting the top surfaces of slots 68 and 70. From this point, by continuing the counter-clockwise rotation of wrench 78, key 12 will apply a slight downwardly directed force to body portion 16 which may be enough to cause arbor 10 to fall out of spindle 54. If this force does not overcome the frictional force between body portion 16 and the wall defining bore 72, arbor 10 can simply be tapped or pulled until it disengages from spindle 54.

As a further safety feature of the present invention, a donut-shaped safety shield 80 for preventing wood or metal chips from flying into the eyes or face of a user may be securely fastened to shield receiving portion 22 of arbor 10. A pair of rubber O-rings 82, 84 are adapted to be snap fit into annular grooves 30, 32, respectively, and shield 80 may then be force fit over O-rings 82, 84 to provide a shield 80 with a secure connection to arbor 10.

Shield 80 includes a central, connecting portion 86 which includes the hole 88 concentrically formed through the middle of shield 80, and it is thus this central connecting portion 86 which contacts O-rings 82, 84. A set of ball bearings 90 are annularly spaced between connecting portion 86 and the remainder of shield 80. Therefore, connecting portion 86 and shield 80 are rotatable with respect to one another. Accordingly, if arbor 10 is rotating at a high RPM, as it will be when in use, and a user's arm comes into contact with shield 80, shield 80 will stop or slow down its rate of rotation. Thus, the user's arm will not get pulled into the cutting area of the rotating tool.

What is claimed is:

1. Improvements in holding a tool in a conventional, power-driven, rotatable spindle machine having a cylindrically elongated spindle rotatably and concentrically mounted within a cylindrically elongated quill, said spindle and quill each having predetermined outer diameters, upper and lower ends, and first and second diametrically opposed openings formed therethrough, said spindle's and quill's first and second openings being manually radially alignable, and said spindle further having a tapered bore of predetermined dimension concentrically formed therein and extending from said spindle's bottom end to said spindle's first and second openings, thereby forming a continuous pathway from said spindle's lower end to an intermediate position along said spindle's length at which intermediate position said spindle's first and second diametrically opposed openings are formed therethrough, said improvements comprising:

a) an elongated arbor having opposite first and second ends, a body portion having a taper dimensioned in corresponding relation to said predetermined dimension of said tapered bore formed in said spindle, said tapered body portion extending from a first intermediate position along said arbor's length to said arbor's second end, said arbor further including a hole concentrically formed therethrough extending from said first end to said second end, at least a portion of said hole having threads formed therein, and said arbor further including a collet receiving portion formed adjacent said arbor's first end; and b) means for mechanically retaining said body portion within said tapered bore.

2. The invention according to claim 1 wherein said mechanical retaining means is comprised of:

a) an elongated first threaded fastener of predetermined configuration sized to be inserted through said first and second spindle and quill openings, and of a predetermined width which is about equal in dimension to said spindle's predetermined outer diameter, said first threaded fastener including a tapped hole formed centrally, transversely therethrough;

b) said hole formed through said arbor including at least first and second distinct passageways each having respective diameters with said second passageway's diameter being smaller than said first passageway's diameter, said first passageway extending from said arbor's first end to a second intermediate position along said arbor's length, and said second passageway extending from said second intermediate position to said arbor's second end, each of said at least first and second passageways being concentrically positioned within said arbor;

c) a second threaded fastener having a head portion of predetermined width and an at least partially threaded shaft portion of predetermined length linearly extending from said head portion, said second threaded fastener adapted to be inserted through said hole formed through said arbor, with said head portion's predetermined width being about the same as said arbor hole's first passageway and said shaft portion sized to freely pass through said arbor hole's second region and operatively engage said tapped hole formed through said first threaded fastener; and d) wrench means for securely threading said second threaded fastener into said first threaded fastener's tapped hole, thereby bridging said arbor to said first threaded fastener and accordingly securely mechanically retaining said arbor within said spindle.

3. The invention according to claim 2 wherein said first passageway of said arbor's hole includes threads formed in the wall thereof and at a position adjacent the interface of said first and second regions.

4. The invention according to claim 3 and further including a retaining nut having external threads formed therein and a hexagonally shaped open center of predetermined width, said nut sized to threadingly engage said threads formed in said arbor hole's first passageway, whereby said retaining nut may be threadingly positioned within said first passageway in abutting relation to said head portion of said second threaded fastener, thereby preventing said second threaded fastener from falling out of said arbor.

5. The invention according to claim 4 wherein said wrench means for threading said second threaded member into said first threaded member is comprised of a first allen head wrench of predetermined dimension smaller than said predetermined width of said retaining nut's open center, and said invention further including a second allen head wrench of predetermined dimension adapted to operatively engage said retaining nut's hexagonal shaped open center in order to thread said retaining nut into said arbor's second region.

6. The invention according to claim 1 and further comprising a shield securely attached to said arbor at a position adjacent said collet receiving portion.

7. The invention according to claim 6 wherein said arbor includes a shield receiving portion positioned between said collet receiving portion and said body portion, said shield receiving portion including shield receiving means.

8. The invention according to claim 7 wherein said shield receiving means is comprised of:

a) first and second grooves annularly formed into said shield receiving portion; and b) first and second O-rings snap fit into said first and second grooves, respectively.

9. The invention according to claim 8 wherein said shield includes a circular connector bracket rotatably attached to said shield and having an open center dimensioned to be snap-fit over said first and second O-rings, thereby frictionally connecting said shield to said arbor.

10. The invention according to claim 9 and further comprising ball bearings are positioned between said shield and said connector bracket, thereby permitting said shield to rotate with respect to said connector bracket.

11. A method of mechanically retaining an arbor within the bore of a spindle on a rotary power tool, said arbor having a passageway extending axially therethrough, said passageway having cylindrical, internal walls with first and second axial portions of respective first and second diameters, said first diameter being smaller than said second diameter and said first and second portions meeting at a fixed shoulder within said passageway and said spindle including a transverse opening communicating with said bore, said method comprising:

a) inserting said first threaded fastener into said bore through said transverse opening;

b) positioning a second threaded fastener at an axially fixed position with respect to said arbor at least a portion of said second fastener being positioned within said passageway;

c) inserting said arbor axially into said spindle bore; and d) threadedly engaging said first and second fasteners to releasably and mechanically retain said arbor in said spindle bore.

12. The method of claim 11 wherein said first fastener comprises a solid member having an internally threaded hole with a central axis, and said member is positioned with said hole axis substantially coaxial with the axis of said spindle bore.

13. The method of claim 12 wherein said second threaded fastener comprises an elongated rod externally threaded from one end for at least a portion of its length and having an enlarged head at the other end, said method comprising positioning said enlarged head within said second portion of said passageway such that said enlarged head abuts said fixed shoulder.

14. The method of claim 13 wherein said second portion of said passageway is internally threaded, and further comprising threadedly engaging an externally threaded member in said second portion to abut said enlarged head and retain said rod in said passageway.

15. The method of claim 14 wherein said enlarged head has first tool engagement means thereon, and further comprising engaging a tool with said first engagement means and rotating said rod to engage said one end thereof with said internally threaded hole.

16. The method of claim 15 wherein said externally threaded member includes a through, axial opening through which said tool is extended to engage said first engagement means.

17. The method of claim 16 wherein said externally threaded member includes second tool engagement means, and wherein said method comprises, in the following sequence:
a) inserting said rod through said first portion of said passageway with said enlarged head abutting said fixed shoulder and said one end of said rod extending axially outwardly from one end of said arbor;
b) advancing said threaded member into said second portion of said passageway to abut said enlarged head;
c) advancing said one end of said arbor into said spindle bore;
d) advancing a tool into said second portion of said passageway and through said central opening in said threaded member to engage said first engagement means; and
e) rotating said rod to threadedly engage said one end thereof with said internally threaded hole in said solid member, which is positioned in said spindle bore.

* * * * *